US010907519B2

(12) United States Patent
Paukner et al.

(10) Patent No.: US 10,907,519 B2
(45) Date of Patent: Feb. 2, 2021

(54) EXHAUST GAS AFTERTREATMENT SYSTEM AND METHOD FOR EXHAUST AFTERTREATMENT OF AN INTERNAL COMBUSTION ENGINE

(71) Applicant: VOLKSWAGEN AKTIENGESELLSCHAFT, Wolfsburg (DE)

(72) Inventors: Stefan Paukner, Wolfsburg (DE); Falk-Christian Baron Von Ceumern-Lindenstjerna, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 29 days.

(21) Appl. No.: 16/227,792

(22) Filed: Dec. 20, 2018

(65) Prior Publication Data

US 2019/0211725 A1    Jul. 11, 2019

(30) Foreign Application Priority Data

Jan. 8, 2018    (DE) .................... 10 2018 100 240

(51) Int. Cl.
*F01N 3/20*    (2006.01)
*F01N 3/10*    (2006.01)
(Continued)

(52) U.S. Cl.
CPC ....... *F01N 3/2006* (2013.01); *B01D 46/0027* (2013.01); *B01D 46/0063* (2013.01);
(Continued)

(58) Field of Classification Search
CPC ............ B01D 46/0027; B01D 46/0063; B01D 53/9454; F01N 13/008; F01N 13/009;
(Continued)

(56) References Cited

U.S. PATENT DOCUMENTS

2007/0017212 A1*  1/2007  Yamauchi .............. F01N 11/007
                                                                  60/277
2011/0072788 A1    3/2011  Ruona et al.
(Continued)

FOREIGN PATENT DOCUMENTS

DE    10 2008 036 127 A1    2/2010
DE    10 2010 046 747 A1    3/2011
(Continued)

OTHER PUBLICATIONS

English Translation of DE 102012021573 (Year: 2012).*
(Continued)

*Primary Examiner* — Anthony Ayala Delgado
(74) *Attorney, Agent, or Firm* — Pearl Cohen Zedek Latzer Baratz LLP

(57) ABSTRACT

The invention relates to an exhaust gas aftertreatment system for an internal combustion engine, in particular for a gasoline engine that is spark-ignited by means of spark plugs. A first three-way catalytic converter is situated in an exhaust gas system that is connected to an outlet of the internal combustion engine in a position close to the engine. Downstream from the first three-way catalytic converter, a four-way catalytic converter or a combination of a particle filter and a second three-way catalytic converter downstream from the particle filter is situated in the underbody position of the motor vehicle. An exhaust gas burner with which hot exhaust gas is introducible into the exhaust gas system downstream from the first three-way catalytic converter and upstream from the four-way catalytic converter or the particle filter is provided at an exhaust duct of the exhaust gas system. The exhaust gas burner is supplied with fresh air by a secondary air pump. The invention further relates to a method for exhaust aftertreatment of an internal combustion engine having such an exhaust gas aftertreatment system.

5 Claims, 6 Drawing Sheets

(51) Int. Cl.
*F01N 3/035* (2006.01)
*F01N 3/021* (2006.01)
*F01N 13/00* (2010.01)
*F01N 3/025* (2006.01)
*F01N 3/22* (2006.01)
*B01D 46/00* (2006.01)
*B01D 53/94* (2006.01)
*F01N 3/023* (2006.01)
*F01N 3/28* (2006.01)

(52) U.S. Cl.
CPC ......... *B01D 53/9454* (2013.01); *F01N 3/021* (2013.01); *F01N 3/023* (2013.01); *F01N 3/025* (2013.01); *F01N 3/035* (2013.01); *F01N 3/101* (2013.01); *F01N 3/2033* (2013.01); *F01N 3/22* (2013.01); *F01N 3/2892* (2013.01); *F01N 13/008* (2013.01); *F01N 13/009* (2014.06); *F01N 13/0093* (2014.06); *F01N 2240/14* (2013.01); *F01N 2560/025* (2013.01); *F01N 2560/06* (2013.01); *F01N 2560/08* (2013.01); *F01N 2900/1404* (2013.01); *F01N 2900/1602* (2013.01)

(58) Field of Classification Search
CPC ............. F01N 13/0093; F01N 2240/14; F01N 2560/025; F01N 2560/06; F01N 2560/08; F01N 2900/1404; F01N 2900/1602; F01N 3/021; F01N 3/023; F01N 3/025; F01N 3/035; F01N 3/101; F01N 3/2006; F01N 3/2033; F01N 3/22; F01N 3/2892
See application file for complete search history.

(56) References Cited

U.S. PATENT DOCUMENTS

| | | | |
|---|---|---|---|
| 2011/0073088 A1* | 3/2011 | Hubbard | F01N 3/021 123/703 |
| 2011/0167802 A1 | 7/2011 | Brück | |
| 2011/0219752 A1 | 9/2011 | Gonze | |
| 2012/0315192 A1* | 12/2012 | Tsujimoto | F01N 3/0236 422/109 |
| 2013/0327023 A1 | 12/2013 | Schlueter et al. | |
| 2016/0222898 A1* | 8/2016 | Ulrey | F02D 41/1448 |
| 2019/0195115 A1 | 6/2019 | Paukner et al. | |

FOREIGN PATENT DOCUMENTS

| | | | |
|---|---|---|---|
| DE | 10 2012 011 603 A1 | 12/2013 | |
| DE | 10 2012 011603 A1 | 12/2013 | |
| DE | 10 2012 021 573 A1 | 5/2014 | |
| DE | 10 2012 021573 A1 | 5/2014 | |
| DE | 102012021573 A1 * | 5/2014 | F23G 7/07 |
| DE | 10 2016 206 394 A1 | 10/2017 | |
| DE | 10 2016 206394 A1 | 10/2017 | |
| DE | 10 2016 211 274 A1 | 12/2017 | |
| EP | 3 502 428 A1 | 6/2019 | |

OTHER PUBLICATIONS

Extended European Search Report (EESR) for European Patent Application No. 19150280.6, dated Mar. 11, 2019.
Office Action for European Patent Application No. 19 150 280.6, dated Feb. 20, 2020.
Search report for German Patent Application No. 10 2018 100 240.8, dated Aug. 8, 2018.

* cited by examiner

EXHAUST GAS AFTERTREATMENT SYSTEM AND METHOD FOR EXHAUST AFTERTREATMENT OF AN INTERNAL COMBUSTION ENGINE

CROSS-REFERENCE TO RELATED APPLICATIONS

This application claims priority from German Patent Application No. 10 2018 100 240.8, filed Jan. 8, 2018, which is hereby incorporated by reference.

FIELD OF THE INVENTION

The invention relates to an exhaust gas aftertreatment system for an internal combustion engine and a method for exhaust aftertreatment of an internal combustion engine according to the preambles of the respective independent claims.

BACKGROUND OF THE INVENTION

The increasing stringency of exhaust emission regulations has placed high demands on automotive manufacturers, which are addressed by suitable measures to reduce uncontrolled engine emissions and appropriate exhaust aftertreatment. The EU6 legislation prescribes a particle count limit for gasoline engines, which in many cases requires use of a gasoline engine particle filter. Such soot particles arise in particular after a cold start of the internal combustion engine due to incomplete combustion, in combination with an overstoichiometric combustion air ratio and cold cylinder walls during the cold start. Thus, the cold start phase plays a crucial role in compliance with the regulatory particulate limits. During driving operation, such a gasoline engine particle filter becomes increasingly loaded with soot. This gasoline engine particle filter must be continuously or periodically regenerated to prevent excessive exhaust back pressure. The increase in exhaust back pressure may result in increased fuel consumption by the internal combustion engine, power loss, and impaired running smoothness, even misfiring. Carrying out thermal oxidation of the soot, retained in the gasoline engine particle filter, with oxygen requires a sufficiently high temperature level together with the simultaneous presence of oxygen in the exhaust gas system of the gasoline engine. Since current gasoline engines are normally operated with a stoichiometric combustion air ratio ($\lambda=1$) without excess oxygen, additional measures are necessary. Examples of such measures include increasing the temperature by adjusting the ignition angle, temporarily adjusting the gasoline engine to lean conditions, blowing secondary air into the exhaust gas system, or a combination of these measures. Thus far, adjustment of the ignition angle in the retarded direction in combination with an adjustment of the gasoline engine to lean has been preferred, since this method does not require additional components, and is able to deliver a sufficient quantity of oxygen in most operating points of the gasoline engine.

As a result of the good efficiencies in the gasoline engine, regeneration of a particle filter in the underbody position is impossible in certain operating situations, so that special driving cycles are necessary for regenerating a particle filter in the underbody position. Positioning the particle filter close to the engine is beneficial, since higher exhaust temperatures are thus present at the particle filter, and heating to a regeneration temperature is facilitated. Another problem with three-way catalytic converters having a three-way catalytically active coating, so-called four-way catalytic converters, is the fact that the coating may exhibit severe aging phenomena, so that an additional three-way catalytic converter in a position close to the engine may be necessary for conversion of the gaseous pollutants.

A method for exhaust aftertreatment of an internal combustion engine is known from DE 10 2008 036 127 A1, in which a particle filter and a three-way catalytic converter are situated in the exhaust duct of the engine. The particle filter, as a first component of the exhaust aftertreatment, is situated downstream from an outlet of the internal combustion engine. A three-way catalytic converter is situated downstream from the particle filter. In the process, the oxygen content in the exhaust gas for regenerating the particle filter is increased by lambda control of the three-way catalytic converter.

DE 10 2010 046 747 A1 discloses an exhaust gas aftertreatment system for a gasoline engine and a method for exhaust aftertreatment. A particle filter is situated downstream from a three-way catalytic converter; for regenerating the soot particles retained in the particle filter a secondary air system may be provided which blows fresh air into the exhaust gas system, downstream from the three-way catalytic converter and upstream from the particle filter.

SUMMARY OF THE INVENTION

The object of the invention is to ensure that a regeneration temperature of the particle filter is reached in all driving cycles, and to allow preferably emission-free regeneration of the particle filter. Further aims are to improve the aging behavior of the exhaust gas aftertreatment system and to overcome the disadvantages known from the prior art.

According to the invention, this object is achieved by an exhaust gas aftertreatment system for an internal combustion engine having an exhaust gas system that is connected to an outlet of the internal combustion engine. The exhaust gas system includes an exhaust duct in which a three-way catalytic converter close to the engine as a first emission-reducing component, and downstream from the three-way catalytic converter close to the engine, a four-way catalytic converter or a combination of a particle filter and a second three-way catalytic converter downstream from the particle filter is situated in the flow direction of an exhaust gas of the internal combustion engine through the exhaust duct. The exhaust gas aftertreatment system also includes a secondary air pump and an exhaust gas burner, wherein, downstream from the three-way catalytic converter close to the engine and upstream from the four-way catalytic converter or the particle filter, at least one introduction point is provided at which the hot exhaust gases of the exhaust gas burner are introducible into the exhaust gas system for heating the four-way catalytic converter or the particle filter. In this context, an arrangement of the three-way catalytic converter close to the engine is understood to mean an arrangement of the exhaust aftertreatment components having an exhaust gas path length of less than 80 cm, in particular less than 50 cm, particularly preferably less than 35 cm, starting from an outlet of the internal combustion engine. Accelerated heating of the three-way catalytic converter, in particular after a cold start of the internal combustion engine, is thus possible. Due to the position of the three-way catalytic converter close to the engine, less waste heat is lost through the walls of the exhaust duct, so that the three-way catalytic converter reaches its light-off temperature comparatively early after a cold start of the internal combustion engine. A large quantity of energy may be introduced into the exhaust gas system via the exhaust gas burner, as the result of which the four-way catalytic converter may be heated to its regeneration temperature close in time after a regeneration request. In addition, the exhaust gas burner may be utilized for heating the four-way catalytic converter during a cold start, so that the four-way catalytic converter reaches its light-off temperature close in time after a cold start and thus allows efficient conversion of pollutants. The internal combustion engine is preferably designed as an internal combustion engine that is spark-ignited by means of spark plugs according to the Otto spark ignition principle.

Advantageous enhancements and refinements of the exhaust gas aftertreatment system according to the invention for an internal combustion engine are possible as a result of the features set forth in the dependent claims.

In one preferred embodiment of the invention, it is provided that the four-way catalytic converter or the particle filter is situated in the underbody position of a motor vehicle. Since in particular with particle filters or four-way catalytic converters in the underbody position, the regeneration temperatures necessary for oxidation of the soot are not reached in low-load driving cycles, in these arrangements it is particularly advantageous to situate an exhaust gas burner upstream from the four-way catalytic converter or the particle filter in order to provide a heating option independent of the exhaust gas of the internal combustion engine. In addition, effective component protection may be achieved due to the temperature regulation via the exhaust gas burner, since the risk of uncontrolled soot burnoff on the four-way catalytic converter or the particle filter is avoided on account of the generally lower temperatures in the underbody position. The risk of thermal damage to the four-way catalytic converter or to the particle filter may thus be effectively reduced.

In one advantageous embodiment, it is provided that a further three-way catalytic converter is situated downstream from the four-way catalytic converter. Due to the three-way catalytic converter, secondary emissions during the oxidation of the soot on the four-way catalytic converter or emissions resulting from control deviations in the lambda control may be eliminated, thus making a further reduction in the emissions possible.

In one preferred embodiment, it is advantageously provided that a mixing path having a length of at least 30 cm, preferably at least 50 cm, is formed between the introduction point and the four-way catalytic converter or the particle filter. This allows better intermixing of the exhaust gases of the exhaust gas burner and of the internal combustion engine before entering the particle filter or the four-way catalytic converter, as the result of which improved lambda control for the exhaust aftertreatment and a more uniform temperature distribution over the four-way catalytic converter or particle filter are possible. The emissions may be further reduced in this way.

According to one preferred embodiment of the invention, it is provided that in the exhaust duct a first lambda probe is situated upstream from the three-way catalytic converter close to the engine, and a second lambda probe is situated directly upstream from the four-way catalytic converter or upstream from the second three-way catalytic converter. The lambda control of the internal combustion engine as well as the control of the exhaust gas burner may thus take place with a pair of lambda probes. A short gas travel time from the exit of the exhaust gas burner to the second lambda probe is advantageous, and allows particularly rapid regulation of the combustion air ratio of the exhaust gas burner. The first lambda probe is preferably designed as a broadband lambda probe to allow a quantitative conclusion concerning the oxygen content in the exhaust gas. The second lambda probe may be designed as a jump lambda probe to reduce the costs and thus provide a qualitative conclusion concerning excess oxygen in the exhaust gas. Alternatively, the second lambda probe may also be designed as a broadband probe to allow quantitative regulation of the combustion air ratio of the exhaust gas burner.

Alternatively, it is advantageously provided that a first lambda probe is situated upstream from the first three-way catalytic converter close to the engine, and a second lambda probe is situated downstream from the four-way catalytic converter or the second three-way catalytic converter. This variant has the advantage that it results in better intermixing of the burner gas and the exhaust gas of the internal combustion engine, and an evaluation of the tailpipe emissions of the internal combustion engine is possible.

One embodiment variant is particularly preferred in which a first lambda probe is situated upstream from the three-way catalytic converter close to the engine, a second lambda probe is situated directly upstream from the four-way catalytic converter, and a third lambda probe is situated downstream from the four-way catalytic converter or the second three-way catalytic converter. This embodiment combines the advantages of the two previously described embodiments with a slight increase in cost and increased complexity of the exhaust gas aftertreatment system.

According to one preferred embodiment of the invention, it is provided that a first pressure sensor is situated upstream from the particle filter or the four-way catalytic converter, and a second pressure sensor is situated downstream from the particle filter or the four-way catalytic converter. A differential pressure measurement may thus be carried out across the particle filter using a pair of pressure sensors, via which the loading state of the particle filter may be determined. A regeneration of the particle filter may thus be initiated based on the pressure difference. In addition, on-board diagnosis of the particle filter may be carried out. Alternatively, the regeneration may be controlled by a loading model of the particle filter or the four-way catalytic converter stored in the control unit of the internal combustion engine.

In one preferred embodiment of the invention, it is provided that the particle filter has a design that is free of a coating, in particular free of a three-way catalytically active coating or a coating for selective catalytic reduction of nitrogen oxides, and/or free of an oxygen store, in particular free of a wash coat having oxygen storage capability. An age-related change in the properties of the particle filter may thus be prevented, so that the particle filter has essentially uniform behavior over its service life. Since the particle filter is acted on directly by the hot exhaust gases of the exhaust gas burner, which for a particle filter having a catalytic coating otherwise result in intensified thermal aging of the catalytic coating, an uncoated embodiment of the particle filter is advantageous. In addition, by dispensing with a coating, the particle filter may be designed with fewer cells, thereby reducing the thermal mass of the particle filter and facilitating heating of the particle filter. Furthermore, the exhaust back pressure is additionally reduced, so that the flow losses in the exhaust gas system may be reduced and the efficiency of the internal combustion engine may thus be increased. With general conditions that are otherwise unchanged, this may be utilized for more power or reduced fuel consumption. In addition, in this way the thermal mass of the particle filter may be reduced and the exhaust back pressure may be decreased, and the ash storage capacity may be increased compared to a coated particle filter. As a result of the lower thermal mass, reaching the regeneration temperature of the particle filter is also facilitated.

In one preferred embodiment of the exhaust gas aftertreatment system, it is provided that the secondary air pump is connected to the exhaust gas burner via an air line. The combustion air ratio of the exhaust gas burner may thus be adjusted, and correspondingly clean and low-emission combustion at the exhaust gas burner may be ensured. In addition, the secondary air pump in the regeneration phases of the four-way catalytic converter or of the particle filter, in which the combustion gas feed to the exhaust gas burner is deactivated, can supply the oxygen that is necessary for oxidizing the soot retained in the four-way catalytic converter or in the particle filter. Alternatively, the secondary air pump may also be directly connected to the exhaust duct upstream from the four-way catalytic converter or the particle filter via a second air line.

According to one preferred, advantageous embodiment of the invention, it is provided that the exhaust gas burner is operable with a variable combustion air ratio. The exhaust gas burner can thus compensate for lambda fluctuations, in particular understochiometric lambda operation in the cold start phase of the internal combustion engine, and thus provide a stoichiometric exhaust gas downstream from the introduction point for the hot burner gases of the exhaust gas burner.

It is particularly preferred when a stoichiometric exhaust gas is adjusted downstream from an introduction point of the exhaust gas burner. A stoichiometric exhaust gas allows particularly efficient exhaust aftertreatment at a three-way catalytic converter or four-way catalytic converter situated downstream from the introduction point.

According to the invention, a method for exhaust aftertreatment of an internal combustion engine, in particular an internal combustion engine that is spark-ignited by means of spark plugs according to the Otto spark ignition principle, having an exhaust gas aftertreatment system according to the invention is proposed which includes the following steps:
 heating the four-way catalytic converter or the particle filter to a regeneration temperature by introducing hot burner gases of the exhaust gas burner, wherein a stoichiometric exhaust gas is adjusted downstream from the four-way catalytic converter or downstream from the second three-way catalytic converter,
 switching off the exhaust gas burner and blowing in secondary air upstream from the four-way catalytic converter or the particle filter, wherein the soot that is retained in the four-way catalytic converter or in the particle filter is oxidized by overstoichiometric exhaust gas.

Use of a method according to the invention allows regeneration of the four-way catalytic converter or of the particle filter, in particular in an arrangement in an underbody position of a motor vehicle, essentially independently of the load state of the internal combustion engine. The four-way catalytic converter or the particle filter may thus be regenerated even in typical low-load traffic, such as in city traffic or in short-distance operation, when regeneration using solely engine-based measures is not possible. In addition, the emissions of the internal combustion engine may also be effectively reduced during the regeneration of the particle filter or of the four-way catalytic converter, since exhaust gas cleaning by the first three-way catalytic converter close to the engine takes place, and during the blowing in of secondary air the burner is switched off, thus minimizing secondary emissions during regeneration of the particle filter or of the four-way catalytic converter.

In one preferred embodiment of the method for exhaust aftertreatment, it is provided that a switch is intermittently made between a heating phase and a regeneration phase until the four-way catalytic converter or the particle filter is completely regenerated. In this context, a heating phase is understood to mean an operating state in which the exhaust gas burner is active and the exhaust gas is heated by the exhaust gas burner. In this context, a regeneration phase is understood to mean an operating state in which the exhaust gas burner is switched off, and secondary air is blown into the exhaust duct upstream from the four-way catalytic converter or the particle filter in order to supply the oxygen that is necessary for oxidizing the soot retained in the four-way catalytic converter or in the particle filter. Since the temperature in the four-way catalytic converter or in the particle filter drops during the regeneration phase when the exhaust gas burner is switched off, the drop in temperature results in termination of the oxidation reaction. A switch is therefore intermittently made between a heating phase and a regeneration phase in order to keep the four-way catalytic converter above the regeneration temperature during the regeneration operation, and to thus allow complete regeneration of the four-way catalytic converter or of the particle filter.

In one preferred embodiment of the method, it is provided that the internal combustion engine is operated with a stoichiometric combustion air ratio during the heating phase and also during the regeneration phase. It is thus possible for the three-way catalytic converter close to the engine to convert harmful exhaust gas components during the regeneration of the four-way catalytic converter or of the particle filter, so that the regeneration of the four-way catalytic converter or of the particle filter does not result in increased tailpipe emissions.

In another enhancement of the method, it is provided that after a regeneration phase in which the exhaust gas burner is switched off, the exhaust gas burner is operated with an understochiometric combustion air ratio, in particular with a combustion air ratio between 0.9 and 0.97, until an oxygen store of the four-way catalytic converter or of the particle filter is emptied. An oxygen store of the four-way catalytic converter or of the particle filter is filled due to secondary air operation in the regeneration phase. During a new start of the exhaust gas burner, this may result in temporary emissions breakthrough of the exhaust gas components to be reduced, in particular nitrogen oxides. To avoid such breakthrough through the four-way catalytic converter, it may be appropriate to temporarily operate the exhaust gas burner with a rich, understochiometric combustion air ratio during the restart in order to empty the oxygen store on the four-way catalytic converter and ensure stoichiometric exhaust gas. It must be ensured that during emptying of the oxygen store, there is no breakthrough of understochiometric exhaust gas through the last catalytically active exhaust aftertreatment component of the exhaust gas system.

The various embodiments of the invention mentioned in the present patent application, unless stated otherwise in the individual case, may advantageously be combined with one another.

BRIEF DESCRIPTION OF THE DRAWINGS

The invention is explained below in exemplary embodiments, with reference to the associated drawings. Identical components or components having an identical function are denoted by the same reference symbols in the various figures, which show the following.

DETAILED DESCRIPTION OF THE INVENTION

Figure 1:
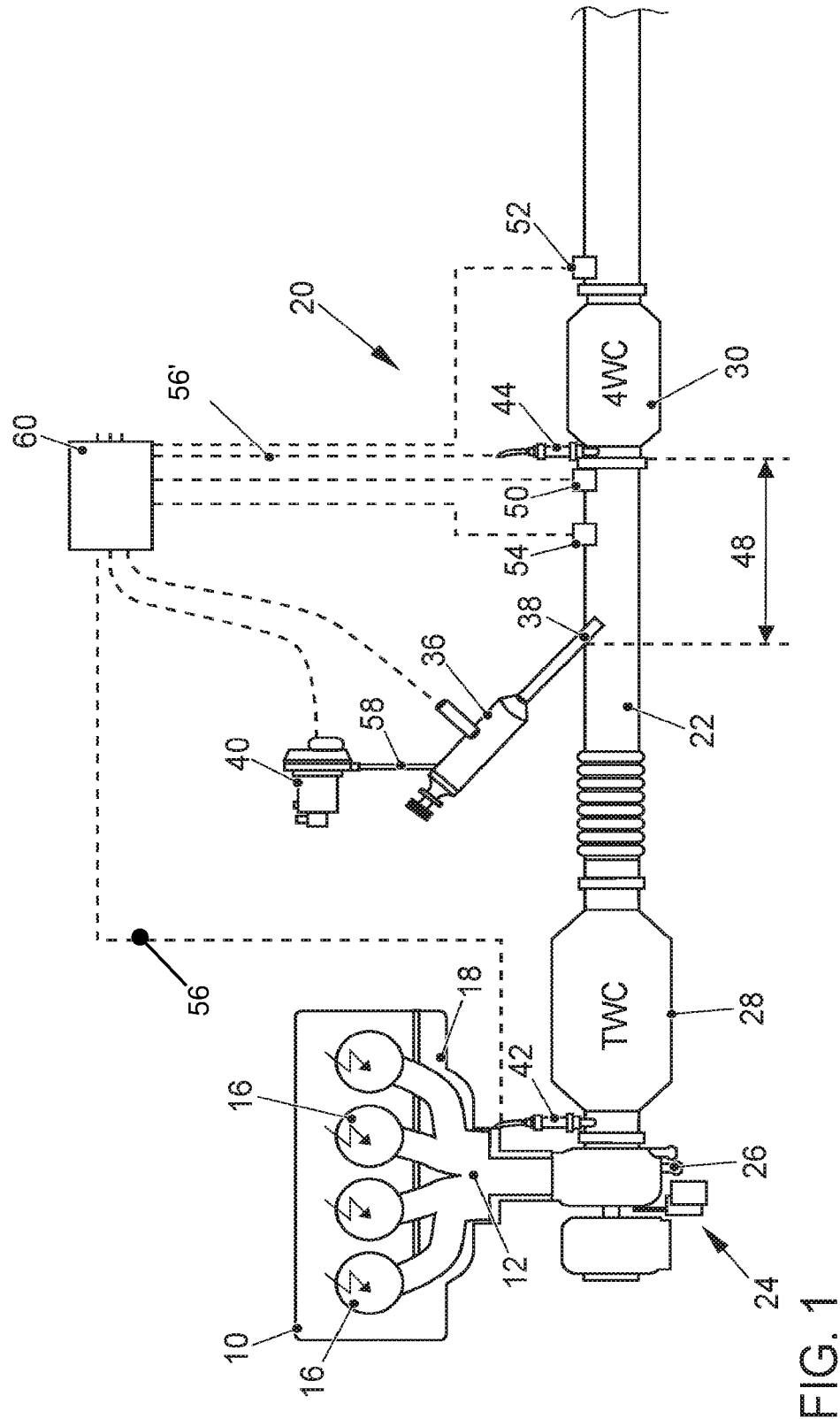
FIG. 1 shows a first exemplary embodiment of an internal combustion engine having an exhaust gas aftertreatment system according to the invention.

FIG. 1 shows a schematic illustration of an internal combustion engine 10 whose outlet 12 is connected to an exhaust gas system 20. The internal combustion engine 10 is designed as a gasoline engine that is spark-ignited by means of spark plugs 16, and that has multiple combustion chambers 14. The internal combustion engine 10 is preferably designed as an internal combustion engine 10 that is charged by means of an exhaust gas turbocharger 24, with a turbine 26 of the exhaust gas turbocharger 24 situated downstream from the outlet 12 and upstream from the first emission-reducing exhaust aftertreatment component, in particular upstream from a three-way catalytic converter 28 close to the engine. The exhaust gas system 20 includes an exhaust duct 22 in which a three-way catalytic converter 28 close to the engine is situated in the flow direction of an exhaust gas through the exhaust duct 22, and a four-way catalytic converter 30 is situated downstream from the three-way catalytic converter 28 close to the engine. The three-way catalytic converter 28 close to the engine is situated at a distance of less than 80 cm exhaust gas path length, in particular less than 50 cm exhaust gas path length, beginning at the outlet 12 of the internal combustion engine 10. The four-way catalytic converter 30 is preferably situated in the underbody position of a motor vehicle, and thus in a position remote from the engine, i.e., at a distance of greater than 100 cm exhaust gas path length, beginning at the outlet 12 of the internal combustion engine 10. Downstream from the first three-way catalytic converter 28 close to the engine and upstream from the four-way catalytic converter 30, an introduction point 38 for hot exhaust gases of an exhaust gas burner 36 is provided, via which the four-way catalytic converter 30 situated downstream from the introduction point 38 may be heated independently of the operating situation of the internal combustion engine 10. The introduction point 38 is spaced apart from the four-way catalytic converter 30, so that a mixing path 48, in which the hot burner gas mixes with the exhaust gas of the internal combustion engine 10, results between the introduction point 38 and the inlet of the four-way catalytic converter 30.

Further catalytic converters, in particular a further three-way catalytic converter 34, a NOx storage catalytic converter, or a catalytic converter for selective catalytic reduction of nitrogen oxides may additionally be situated in the exhaust gas system 20. Situated in the exhaust duct 22, upstream from the first three-way catalytic converter 28, is a first lambda probe 42 with which the oxygen content $\lambda_1$ of the exhaust gas downstream from the outlet 12 and upstream from the first exhaust aftertreatment component, i.e., the first three-way catalytic converter 28 close to the engine, may be determined. Situated in the exhaust duct 22, downstream from the introduction point 38 and upstream from the four-way catalytic converter 30, is a second lambda probe 44 with which the oxygen content $\lambda_2$ in the exhaust duct 22 directly upstream from the four-way catalytic converter 30 may be determined. The first lambda probe 42 is preferably designed as a broadband lambda probe, and is connected to a control unit 60 of the internal combustion engine 10 via a first signal line 56. The second lambda probe 44 is preferably designed as a jump probe, and is connected to the control unit 60 via a second signal line 56'. The first lambda probe 42 and the second lambda probe 44 form a sensor system with which the combustion air ratio $\lambda$ of the internal combustion engine 10 and of the exhaust gas burner 36 may be regulated. In addition, on-board diagnosis of the first three-way catalytic converter 28 may take place via the sensor system.

A secondary air pump 40 is connected to the exhaust gas burner 36 via a secondary air line 58. A secondary air valve with which the air supply to the exhaust gas burner 36 may be provided and interrupted may be situated in the secondary air line 58. In addition, pressure sensors 50, 52 may be provided upstream and downstream from the four-way catalytic converter 30, and may carry out a differential pressure measurement across the four-way catalytic converter 30 to determine the loading state of the four-way catalytic converter 30. Furthermore, on-board diagnosis of the four-way catalytic converter 30 may take place via the pressure sensors 50, 52. The secondary air pump 40 may be additionally connected to a further introduction point at the exhaust duct 22 via a further secondary air line, so that the secondary air may be introduced into the exhaust duct 22 independently of the exhaust gas burner 36. In addition, even further sensors, in particular a temperature sensor 54 or a NOx sensor, may be situated in the exhaust gas system 20 to control the combustion of the internal combustion engine 10 and/or of the exhaust gas burner 36.

Figure 2:
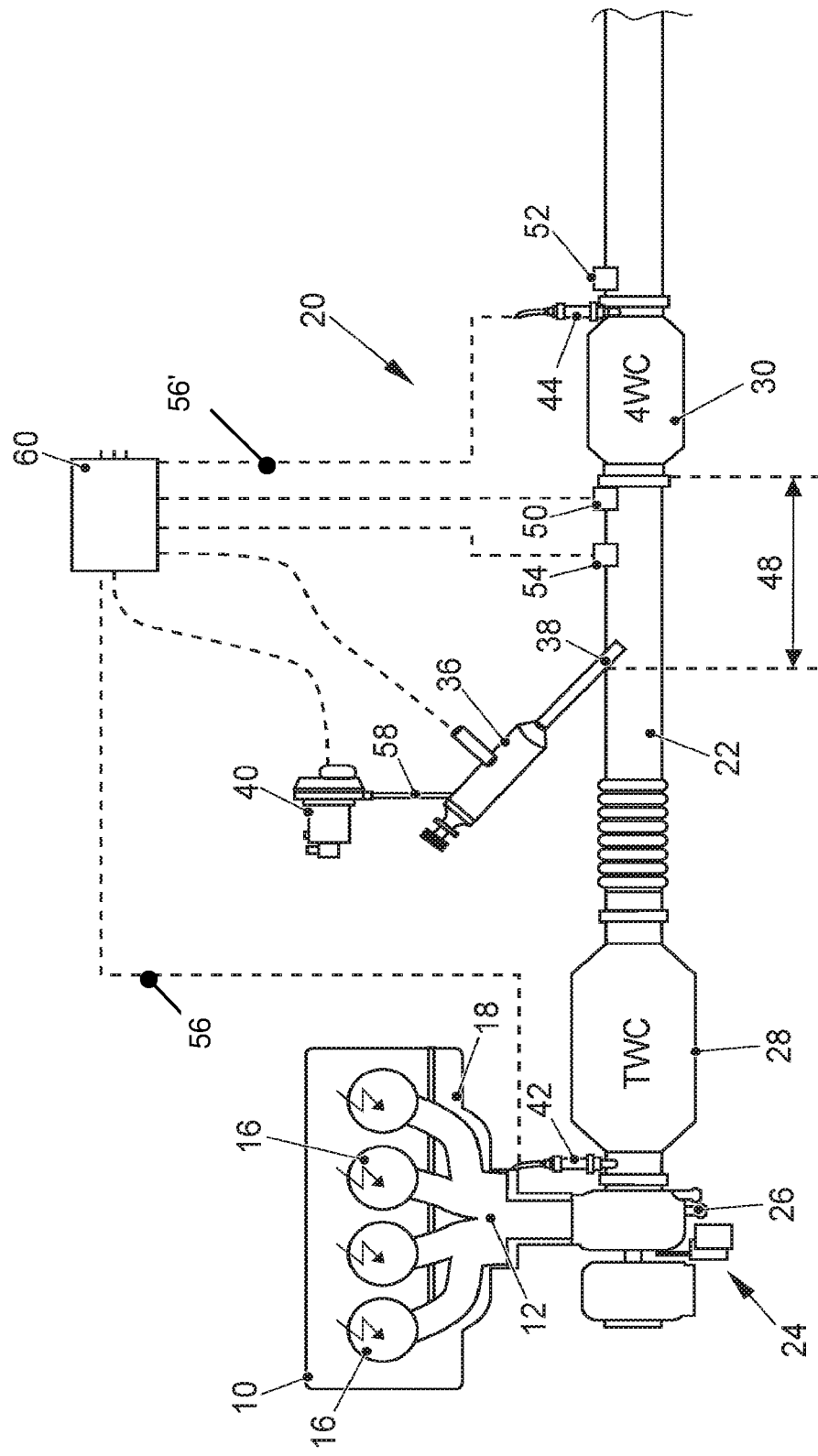
FIG. 2 shows one variant of the exhaust gas aftertreatment system according to the invention, in which the second lambda probe is situated downstream from the four-way catalytic converter in the underbody position.

FIG. 2 illustrates one variant of the exhaust gas aftertreatment system from FIG. 1. With essentially the same design, the second lambda probe 44 in this variant is situated downstream from the four-way catalytic converter 30, thus allowing determination of the exhaust gas-to-air ratio downstream from the four-way catalytic converter 30. The advantage of this variant is that there is better intermixing of the burner gas and the exhaust gas of the internal combustion engine 10, and an evaluation of the tailpipe lambda value is possible. A disadvantage of this variant, however, is that the signal has increased inertia due to the oxygen storage capability of the four-way catalytic converter 30, wherein any control deviation of the lambda control directly results in increased tailpipe emissions.

Figure 3:
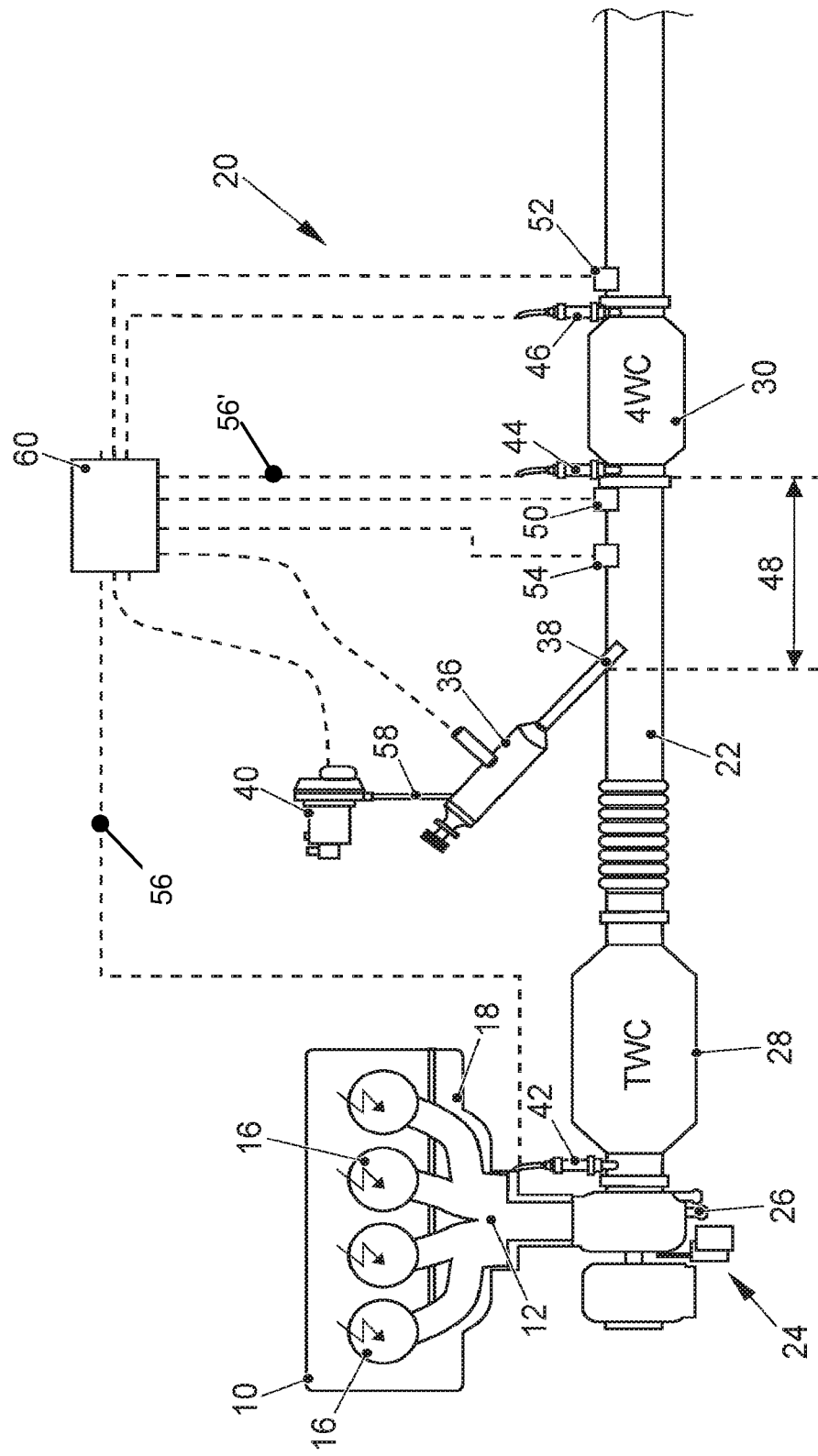
FIG. 3 shows another variant of the exhaust gas aftertreatment system according to the invention, in which the second lambda probe is situated upstream from the four-way catalytic converter in the underbody position, and a third lambda probe is situated downstream from the four-way catalytic converter in the underbody position.

FIG. 3 shows a third variant of the exhaust gas aftertreatment system. With essentially the same design as in FIG. 2 and FIG. 3, a second lambda probe 44 in this variant is provided directly upstream from the four-way catalytic converter 30, and a third lambda probe 46 is provided downstream from the four-way catalytic converter 30. This variant has the advantage that the benefits of the two previously mentioned variants may be combined with one another. However, it is disadvantageous that the complexity of the control and the costs increase due to an additional lambda probe.

Figure 4:
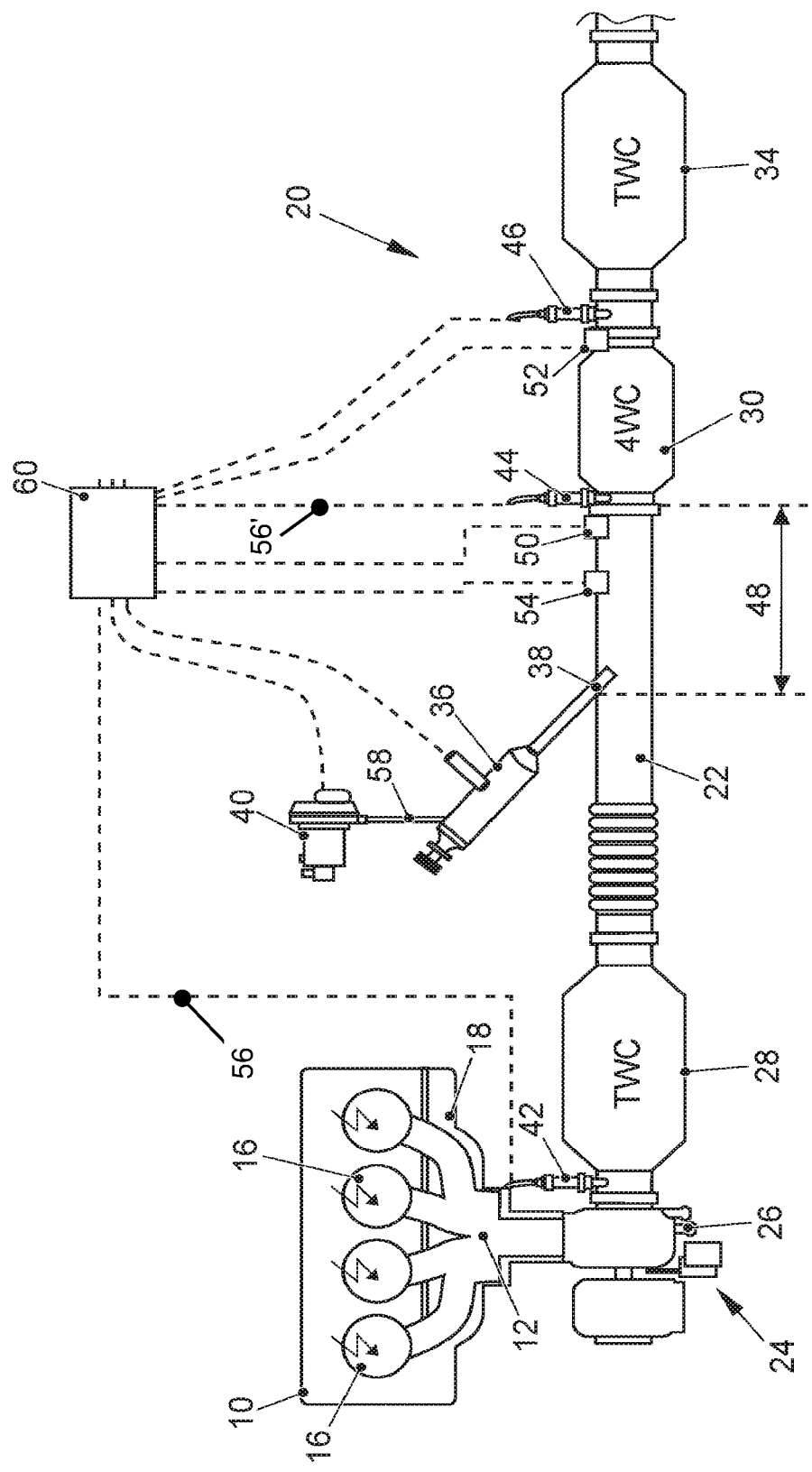
FIG. 4 shows a second exemplary embodiment of an internal combustion engine having an exhaust gas aftertreatment system according to the invention, wherein the exhaust gas aftertreatment system additionally has a further three-way catalytic converter, downstream from the four-way catalytic converter, in the underbody position.

FIG. 4 illustrates another exemplary embodiment of an internal combustion engine 10 having an exhaust gas aftertreatment system. With essentially the same design as in FIGS. 1 through 3, a further three-way catalytic converter 34 is situated in the exhaust duct 22, downstream from the four-way catalytic converter 30. The goal of stoichiometric tailpipe exhaust gas during operation of the exhaust gas burner 36 may thus be more easily achieved, since a further component having an oxygen store is present. Lambda breakthroughs through the four-way catalytic converter 30 may thus be compensated for by the oxygen storage capability of the three-way catalytic converter 34 situated downstream from the four-way catalytic converter 30. This results in further improvement in the tailpipe emissions.

Figure 5:
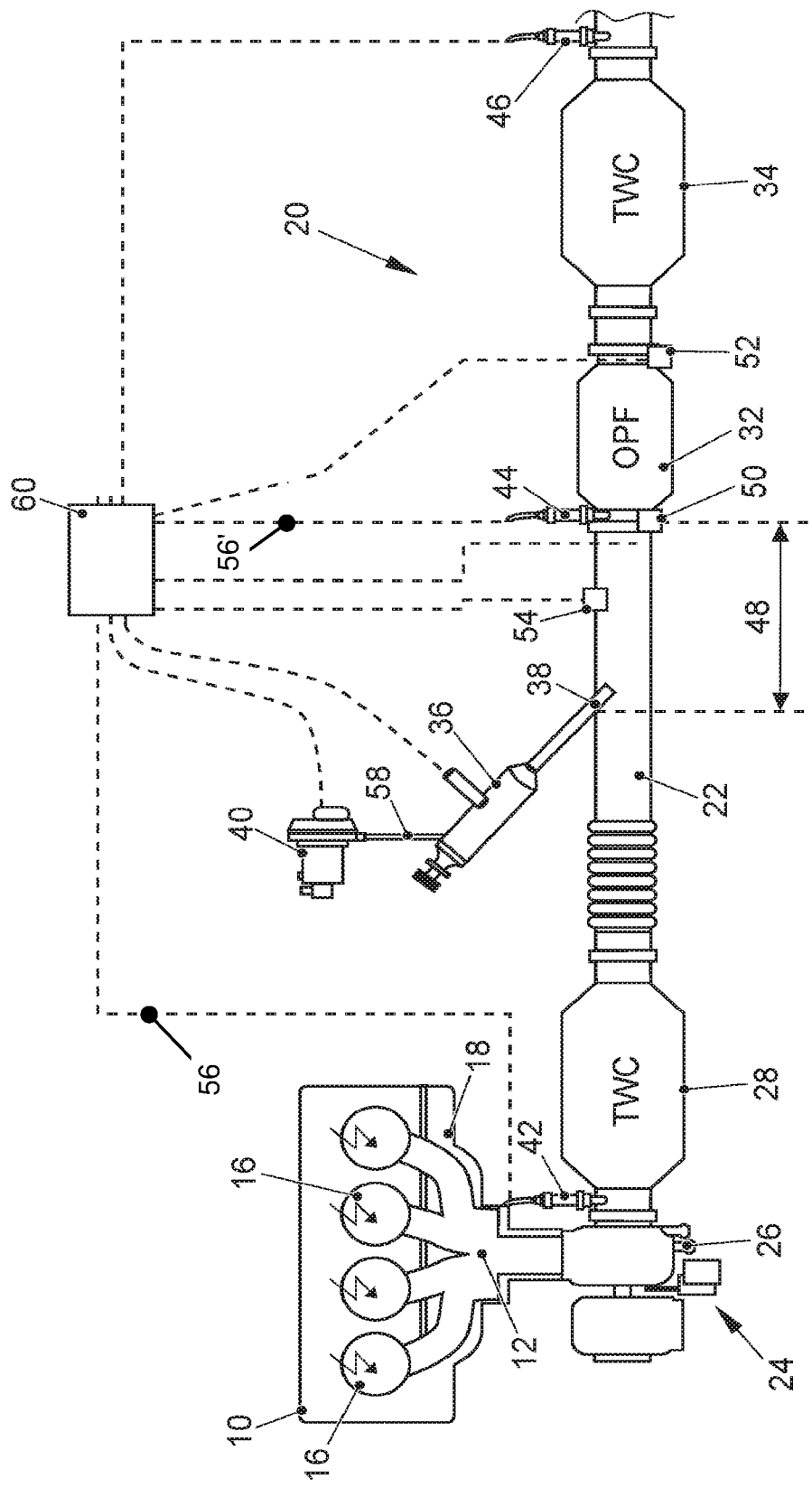
FIG. 5 shows a third exemplary embodiment of an internal combustion engine having an exhaust gas aftertreatment system according to the invention, wherein the exhaust gas aftertreatment system has an uncoated particle filter and a three-way catalytic converter, downstream from the uncoated particle filter, in the underbody position.

FIG. 5 illustrates another exemplary embodiment of an internal combustion engine 10 according to the invention. With essentially the same design as in FIG. 4, instead of a four-way catalytic converter 30 an uncoated particle filter 32 is provided in the exhaust gas system 20. This exemplary embodiment has the advantage that an uncoated particle filter 32 is easier and more cost-efficient to manufacture. In addition, an uncoated particle filter 32 does not age since it has no catalytic coating. Furthermore, for an uncoated particle filter 32 the exhaust back pressure is lower than for a four-way catalytic converter 30. However, a drawback compared to the exemplary embodiments illustrated in FIGS. 1 through 3 is that an additional component must be integrated into the exhaust gas system 20, resulting in greater space requirements, higher costs, and a higher exhaust back pressure.

Figure 6:
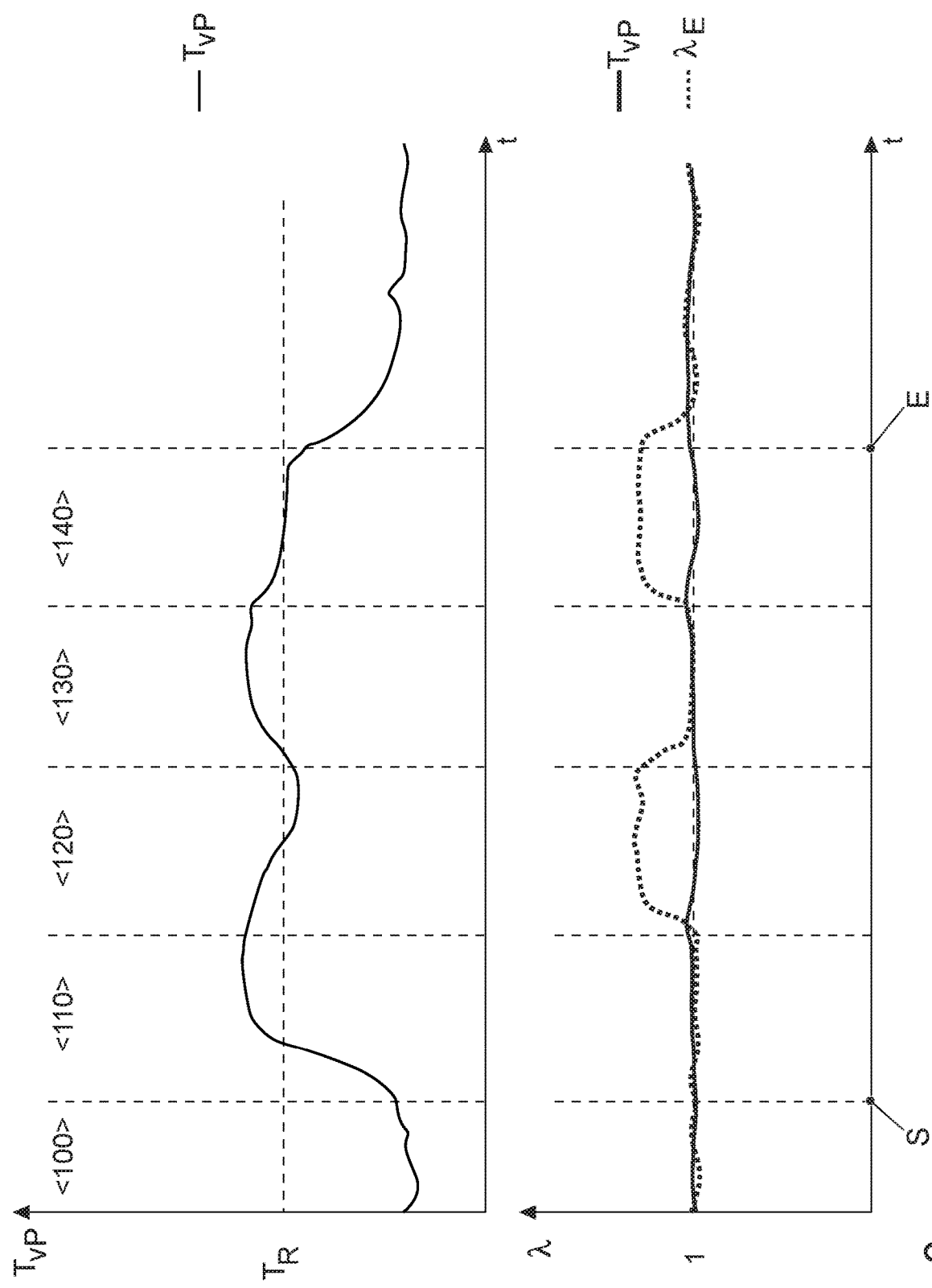
FIG. 6 shows a diagram illustrating the variation of temperature over time and the exhaust gas-to-air ratio in the exhaust gas system while carrying out a method according to the invention for exhaust aftertreatment.

FIG. 6 illustrates the variation of temperature over time upstream from the four-way catalytic converter 30 or the particle filter 32 while carrying out a method according to the invention for exhaust aftertreatment. In addition, FIG. 6 shows the exhaust gas-to-air ratio λ upstream from the three-way catalytic converter 28 close to the engine ($\lambda_{vT}$) and downstream from the last catalytically active component 30, 34 of the exhaust gas aftertreatment system ($\lambda_E$). The internal combustion engine 10 is always operated with a stoichiometric combustion air ratio λ=1, so that the pollutant emissions that occur during the engine-related combustion may be converted by the three-way catalytic converter 28 close to the engine. In a first method step <100> the internal combustion engine 10 is operated with a stoichiometric combustion air ratio, and the exhaust gas burner 36 and the secondary air pump 40 are deactivated. When a regeneration of the four-way catalytic converter 30 or of the particle filter 32 is requested by the control unit 60 of the internal combustion engine 10, the regeneration is started at a time S. Such a start of the regeneration may be initiated via a loading model of the four-way catalytic converter 30 or the particle filter 32, or via a differential pressure measurement. The exhaust gas burner 36 for heating the particle filter 32 or the four-way catalytic converter 30 is activated in a method step <110>, wherein a stoichiometric exhaust gas-to-air ratio $\lambda_E$ downstream from the four-way catalytic converter 30 or downstream from the second three-way catalytic converter 34 of $\lambda_E=1$ is adjusted. If the four-way catalytic converter 30 or the particle filter 32 has reached a temperature above the regeneration temperature $T_R$, in a method step <120> the exhaust gas burner 36 is deactivated, and air is blown into the exhaust duct 22 upstream from the four-way catalytic converter 30 or the particle filter 32 by means of the secondary air pump 40. The internal combustion engine 10 continues to be operated with a stoichiometric combustion air ratio λ=1 in this regeneration phase, as a result of which the engine-related emissions continue to be converted by the first three-way catalytic converter 28 close to the engine. The goal of blowing in the secondary air is less excess air in the range of 1.05<λ<1.2 upstream from the four-way catalytic converter 30 or the particle filter 32 for regenerating the embedded soot. This ensures effective regeneration of the four-way catalytic converter 30 or of the particle filter 32. In addition, the situation of uncontrolled soot burnoff resulting in damage to the four-way catalytic converter 30 or to the particle filter 32 is effectively avoided. Since the four-way catalytic converter 30 or the particle filter 32 is cooled by blowing in the secondary air, in a method step <130> the exhaust gas burner 36 is reactivated and the four-way catalytic converter 30 or the particle filter 32 is reheated. The combustion air ratio of the internal combustion engine 10 is once again stoichiometric in this phase. The combustion air ratio of the exhaust gas burner 36 is stoichiometric or slightly rich, so that no regeneration of the four-way catalytic converter 30 or of the particle filter 32 takes place. It may be advantageous when the exhaust gas burner 36 is operated with slightly understochiometric, rich combustion air until the oxygen store (OSC) of the four-way catalytic converter 30 is emptied, in order to avoid emissions breakthrough of the exhaust gas components to be reduced, in particular nitrogen oxides. This intermittent operation is maintained until the four-way catalytic converter 30 or the particle filter 32 is regenerated. For this purpose, the second heating phase <130> is followed by a new regeneration phase <140> in which the exhaust gas burner 36 is once again deactivated, and secondary air is blown into the exhaust duct 22 via the secondary air pump 40. The end of the regeneration is controlled via a loading model or a differential pressure measurement across the two pressure sensors 50, 52.

In summary, it may be concluded that by use of an exhaust gas aftertreatment system according to the invention and the described method according to the invention, reaching a regeneration temperature of the particle filter 32 or of the four-way catalytic converter 30 may be ensured in all driving cycles, and a preferably emission-free regeneration of the particle filter 32 or of the four-way catalytic converter 30 is made possible.

LIST OF REFERENCE SYMBOLS 10 internal combustion engine
12 outlet
14 combustion chamber
16 spark plug
18 cylinder head
20 exhaust gas system
22 exhaust duct
24 exhaust gas turbocharger
26 turbine
28 three-way catalytic converter close to the engine 30 four-way catalytic converter
32 uncoated particle filter
34 second three-way catalytic converter
36 exhaust gas burner
38 introduction point
40 secondary air pump
42 first lambda probe
44 second lambda probe
46 third lambda probe
48 mixing path
50 first pressure sensor
52 second pressure sensor
54 temperature sensor
56 signal line
58 air line
60 control unit
<100> stoichiometric normal operation of the internal combustion engine
<110> heating phase
<120> first regeneration phase
<130> heating phase
<140> second regeneration phase
E end of the regeneration of the particle filter or of the four-way catalytic converter
S start of the regeneration of the particle filter or of the four-way catalytic converter
$T_{vP}$ temperature upstream from the particle filter or the four-way catalytic converter
$T_R$ regeneration temperature of the particle filter or the four-way catalytic converter
$\lambda$ exhaust gas-to-air ratio
$\lambda_E$ exhaust gas-to-air ratio downstream from the last catalytically active exhaust aftertreatment component
$\lambda_{vT}$ exhaust gas-to-air ratio upstream from the three-way catalytic converter close to the engine

The invention claimed is:

1. A method for exhaust aftertreatment of an internal combustion engine having an exhaust gas aftertreatment system comprising an exhaust gas system that is connectable to an outlet of the internal combustion engine, wherein the exhaust gas system includes an exhaust duct in which a first three-way catalytic converter close to the engine, a four-way catalytic converter downstream from the first three-way catalytic converter, and a second three-way catalytic converter downstream from the four-way catalytic converter are situated in the flow direction of an exhaust gas of the internal combustion engine through the exhaust duct, and a secondary air pump and an exhaust gas burner, wherein, downstream from the first three-way catalytic converter and upstream from the four-way catalytic converter, at least one introduction point is provided at which the hot exhaust gases of the exhaust gas burner are introducible into the exhaust gas system for heating the four-way catalytic converter, the method comprising the following steps:

heating the four-way catalytic converter to a regeneration temperature by introducing hot burner gases of the exhaust gas burner, wherein a stoichiometric exhaust gas is adjusted downstream from the four-way catalytic converter, switching off the exhaust gas burner and blowing in secondary air upstream from the four-way catalytic converter, wherein the soot that is retained in the four-way catalytic converter is oxidized by overstoichiometric exhaust gas ($\lambda$>1).

2. The method for exhaust aftertreatment according to claim 1, wherein a switch is intermittently made between a heating phase and a regeneration phase until the four-way catalytic converter is completely regenerated.

3. The method for exhaust aftertreatment according to claim 1, wherein the internal combustion engine is operated with a stoichiometric combustion air ratio ($\lambda$=1) during the heating phase and also during the regeneration phase.

4. The method for exhaust aftertreatment according to claim 1, wherein, after a regeneration phase in which the exhaust gas burner is switched off, the exhaust gas burner is operated with an understochiometric combustion air ratio until an oxygen store of the four-way catalytic converter is emptied.

5. A method for exhaust aftertreatment of an internal combustion engine having an exhaust gas aftertreatment system comprising an exhaust gas system that is connectable to an outlet of the internal combustion engine, a secondary air pump and an exhaust gas burner, wherein the exhaust gas system includes an exhaust duct in which a first emission reducing component and a second emission reducing component downstream from the first emission reducing component are situated in the flow direction of an exhaust gas of the internal combustion engine through the exhaust duct, wherein the first emission reducing component is a first three-way catalytic converter close to the engine, wherein the second emission reducing component is:

a four-way catalytic converter, or a second three-way catalytic converter downstream from a particle filter, wherein downstream from the first emission reducing component and upstream from the second emission reducing component at least one introduction point is provided, at which the hot exhaust gases of the exhaust gas burner are introducible into the exhaust gas system for heating the second emission reducing component, wherein the method comprises:

heating the second emission reducing component to a regeneration temperature by introducing hot burner gases of the exhaust gas burner to at least one introduction point downstream from the first emission reducing component and upstream from the second emission reducing component, wherein a stoichiometric exhaust gas is adjusted downstream from the second emission reducing component four-way catalytic converter, switching off the exhaust gas burner and blowing in secondary air upstream from the second emission reducing component, wherein the soot that is retained in second emission reducing component is oxidized by overstoichiometric exhaust gas ($\lambda$>1).

* * * * *